US008254581B2

(12) United States Patent
Wan et al.

(10) Patent No.: US 8,254,581 B2
(45) Date of Patent: Aug. 28, 2012

(54) LIGHTWEIGHT KEY DISTRIBUTION AND MANAGEMENT METHOD FOR SENSOR NETWORKS

(75) Inventors: Chieh-Yih Wan, Hillsboro, OR (US); Mark Yarvis, Portland, OR (US); Jens Mache, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/236,494

(22) Filed: Sep. 19, 2011

(65) Prior Publication Data

US 2012/0008787 A1      Jan. 12, 2012

(51) Int. Cl.
*H04L 9/08* (2006.01)
*G06F 11/30* (2006.01)
(52) U.S. Cl. ........................................ 380/278; 713/193
(58) Field of Classification Search .................. 380/278; 713/193
See application file for complete search history.

(56) References Cited

U.S. PATENT DOCUMENTS 7,096,494 B1    8/2006  Chen
7,110,982 B2    9/2006  Feldman et al.
2003/0021417 A1  1/2003  Vasic et al.
2003/0210789 A1  11/2003  Farnham et al.
2005/0125670 A1  6/2005  Sozzani et al.

OTHER PUBLICATIONS

Chris Karlof, Naveen Sastry, and David Wagner, "TinySec: A Link Layer Security Architecture for Wireless Sensor Networks," Proceedings of the Second ACM Conference on Embedded Networked Sensor Systems (SenSys 2004), Nov. 2004.
A. Perrig, R. Szewczyk, V. Wen, D. Culler, and J.D. Tygar, "SPINS: Security protocols for sensor networks," in Proceedings of the 7th Annual ACM/IEEE International Conference on Mobile Computing and Networking (MobiCom), Rome, Italy, Jul. 2001, pp. 189-199.

*Primary Examiner* — Peter Poltorak
*Assistant Examiner* — Teshome Hailu
(74) *Attorney, Agent, or Firm* — Carrie A. Boone, P.C.

(57) ABSTRACT

A lightweight security framework is disclosed that combines PKI with symmetric key cryptography to exploit the system asymmetry in hierarchical sensor networks. The framework provides protocols for public key exchange, session and group key generation, pair-wise key generation, and network resource protection in a low-cost security architecture. The security framework shifts much of the security-related computational load off of the resource-constrained sensor nodes and on to resource-rich base station nodes. The method is based on the generation and management of two kinds of symmetric keys from a set of bootstrapping asymmetric keys on each node.

19 Claims, 6 Drawing Sheets

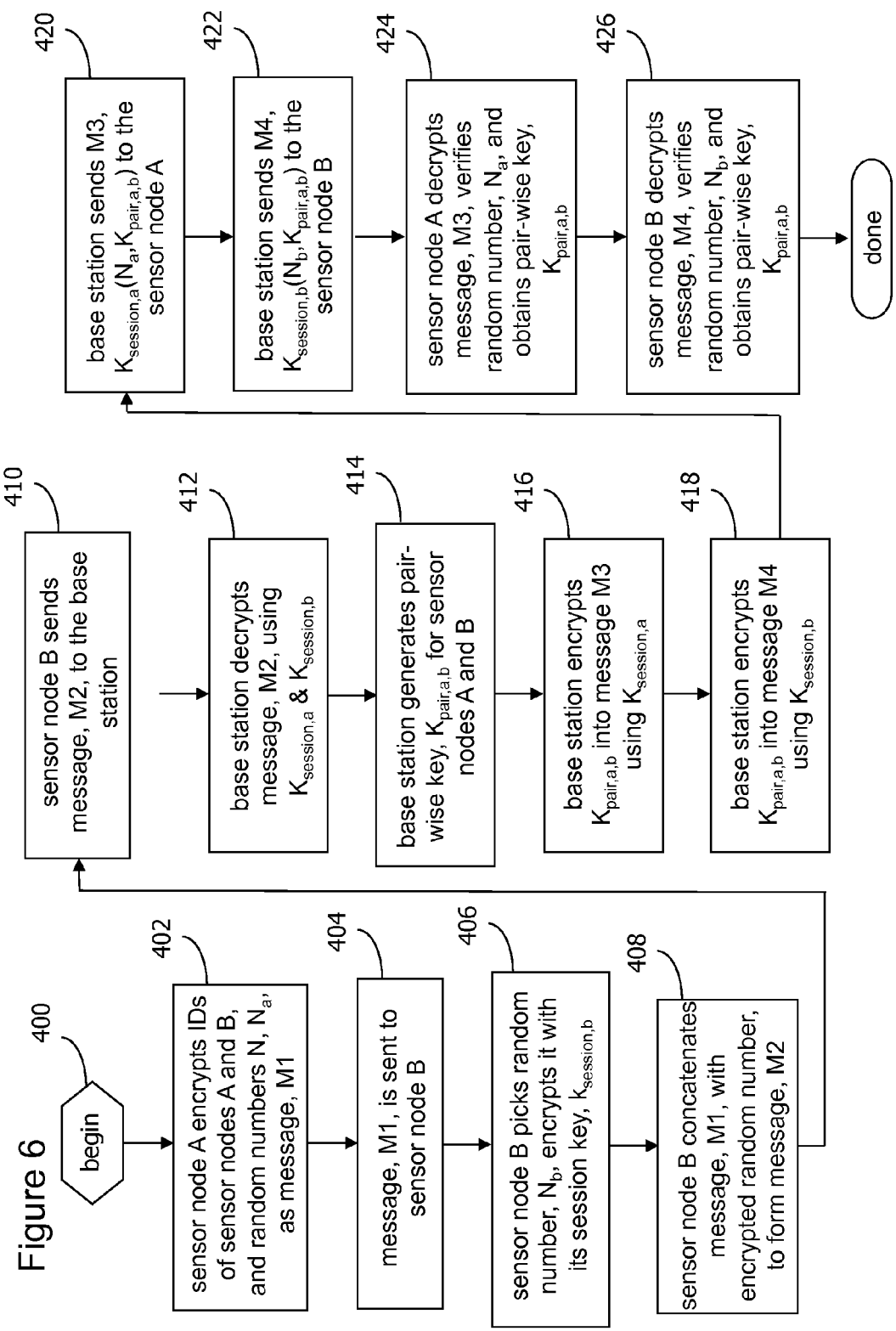

LIGHTWEIGHT KEY DISTRIBUTION AND MANAGEMENT METHOD FOR SENSOR NETWORKS

CROSS-REFERENCE TO RELATED APPLICATIONS

This application claims priority to U.S. patent application Ser. No. 11/751,643, filed on May 22, 2007 now abandoned.

TECHNICAL FIELD

This application relates to network security and, more particularly, to a method to secure sensor networks.

BACKGROUND

Distribution of cryptographic keys forms the basis for protection of both data and networking resources in any network. Privacy, integrity, and authenticity are key capabilities identified as requirements for sensor networks, particularly those used in sensitive applications, such as healthcare. Sensor networks are networks of embedded devices (often wireless, resource-constrained, battery-powered, and composed in an ad hoc and/or multi-hop communication topology) that provide a distributed interface between the physical world and the digital world. Sensor networks sense information about people, places, and environments, make that information available to computers and people, and sometimes perform automated actuation. Providing these capabilities for sensor networks is challenging. Existing key distribution architectures tend to introduce overheads that are too high for the low power nodes that are typical. In addition, the ad hoc networks that are typical in some sensor network applications require extremely flexible and dynamic solutions.

Typical existing public key infrastructures (PKIs) provide robust and widely deployable key distribution schemes to enable privacy and authentication in a distributed system. However, public key cryptography introduces a high computation and energy consumption overhead, and thus must be used sparingly (if at all) in sensor networks. Therefore, current security proposals for sensor networks typically focus on symmetric cryptography, in which either each node shares a secret key with another node (pair-wise shared secret key) or the whole cluster of nodes share the same secret key (group key). These shared keys are pre-distributed or pre-configured at the time of deployment and often remain fixed throughout the entire lifetime of the application.

Use of symmetric keys, with either dynamic key distribution or key pre-distribution, may have several disadvantages:

Inflexible Keying of Symmetric Keys.

While symmetric group keys are lightweight in terms of computation and memory requirements, they do not identify the packet originator (every node shares the same secret key). Pair-wise symmetric keying allows authentication of packet originators, but the memory requirement to store all pair-wise keys on each sensor node simply does not scale with network size.

Vulnerability of Pre-Distributed Keys to Eavesdropping and Cryptanalysis.

Since key length is typically limited to save overhead in extremely resource-constrained devices and the key is fixed throughout the application lifetime, these systems tend to be vulnerable to exhaustive search attack or semantic analysis of intercepted packets.

Not Adaptive to Changes in Network Topology.

Secure addition of a new node into a network typically introduces significant communication overhead, especially when the network is large. A network that uses pre-distributed pair-wise keys is typically limited to a fixed member set.

Thus, there is a need for a key distribution and management method for sensor networks.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 6 is a flow diagram of the pair-wise key generation protocol of FIG. 5, according to some embodiments.

DETAILED DESCRIPTION

In accordance with the embodiments described herein, a lightweight security framework is disclosed that combines PKI with symmetric key cryptography to exploit the system asymmetry in hierarchical sensor networks. The framework combines several techniques to enable secure data transmission with low overhead. The lightweight security framework employs public/private keys to authenticate sensor nodes, as well as to generate session keys from the public/private keys. The framework also generates session keys to authenticate and protect data sent between sensor nodes and gateways. The framework generates pair-wise session keys on demand, for node-to-node communication. And, the framework uses session keys to securely distribute group keys, the group keys allowing inauthentic messages received by sensor nodes to be dropped quickly, to protect network resources through early packet dropping.

This combination of occasionally used public keys, symmetric pair-wise session keys for end-to-end data authentication and privacy, and a group key to protect link layer network resources enables a unique and low-cost security architecture. This security framework shifts most of the security-related computational load off of the resource-constrained sensor nodes and on to resource-rich base station nodes. The methods employed by the lightweight security framework are based on the generation and management of two kinds of symmetric keys from a set of bootstrapping asymmetric keys on each node.

Figure 1:
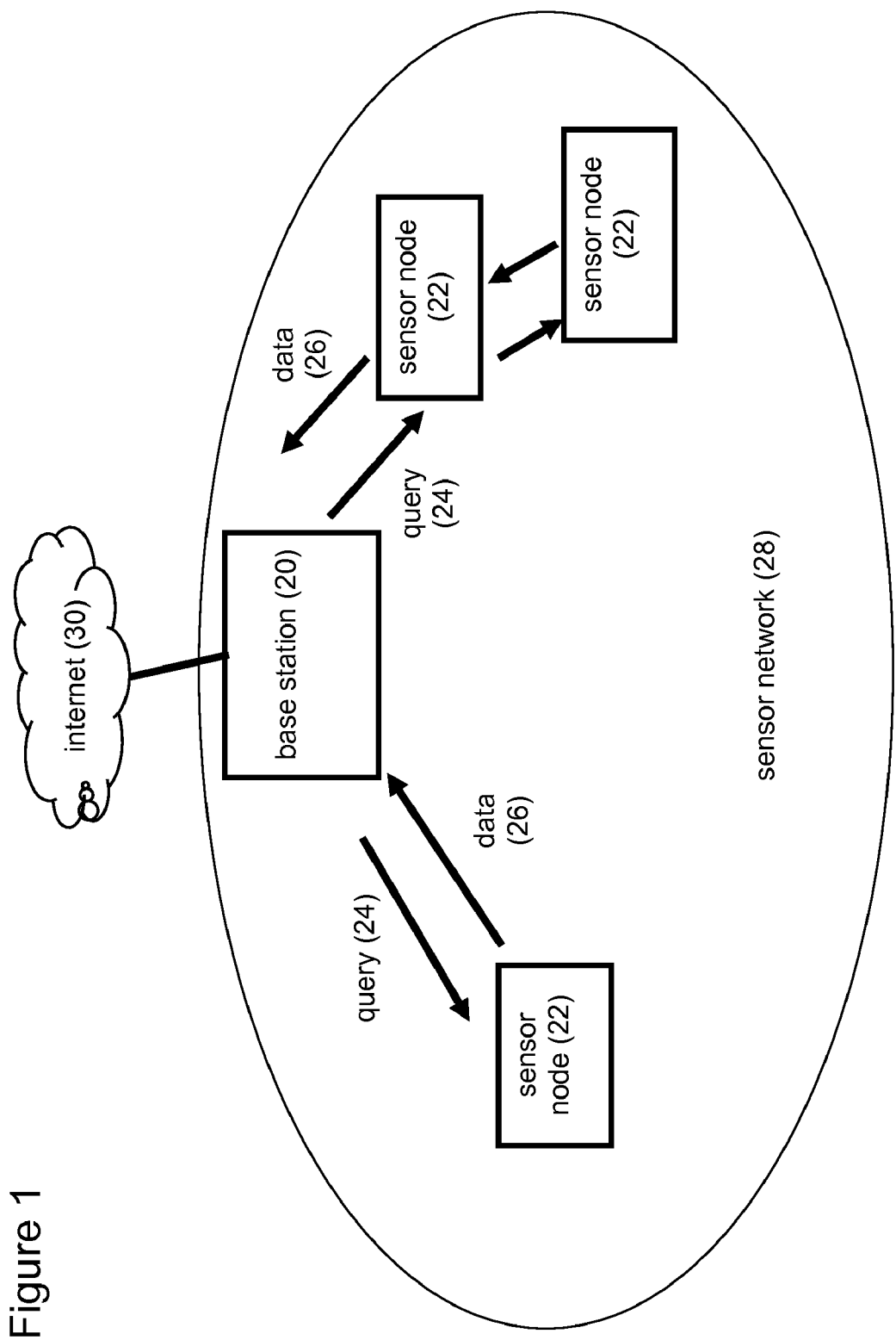
FIG. 1 is a schematic diagram of a sensor network, according to some embodiments.

The network consists of two types of nodes as shown in FIG. 1: base stations (BS) 20 and sensor nodes (SN) 22. Sensor nodes 22 are resource-limited devices (often battery-powered) that sense and transmit actual data when queried. Base stations are less constrained nodes (often line-powered) that connect to an external network, such as the Internet 30, generate queries according to a user specification, and collect data from the sensor nodes. The base stations 20 and sensor nodes 22 make up a sensor network 28.

A query 24 is a message that contains configuration parameters (e.g., the sampling rate, sample size, etc.) for the data acquisition to be carried out on a specific sensor node. Sensor nodes 22 form network clusters (typically with a multiple-hop topology) around base stations 20, which control the sensor network 28 and allow data to flow between the external network, such as the Internet 30, and the sensor network 28.

An adversary may eavesdrop data packets (passively), modify transmitted data packets, or actively inject bogus packets (possibly replayed), either intending them to be received or intending simply to drain energy of battery-powered sensor nodes 22. One remedy to these threats is for the legitimate nodes to apply cryptographic keys to encrypt and/or sign the data (to provide privacy and/or authenticate the source), and to drop unauthenticated packets as early as possible.

Figure 2:
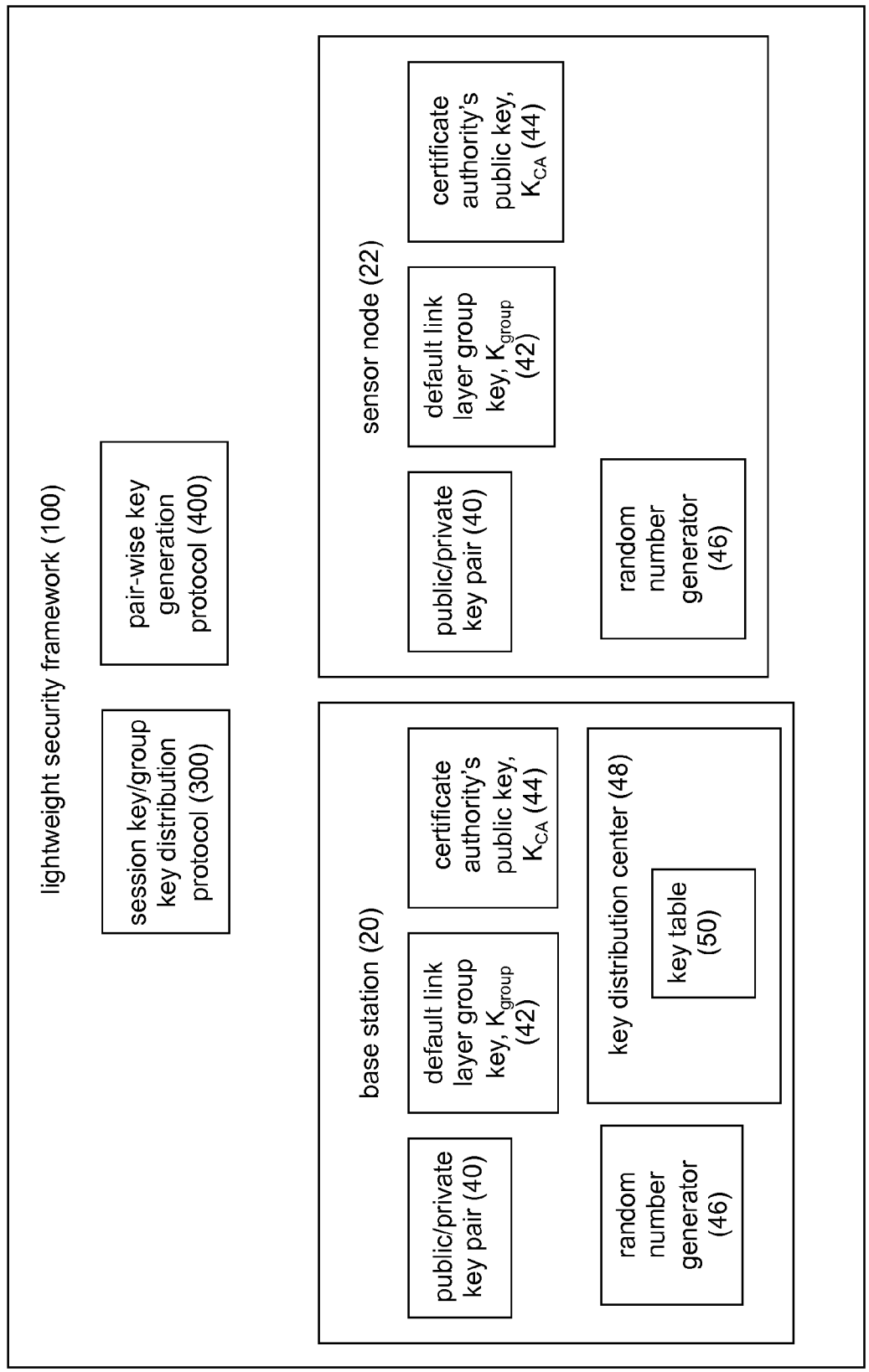
FIG. 2 is a block diagram of a lightweight security framework, according to some embodiments.
Figure 4:
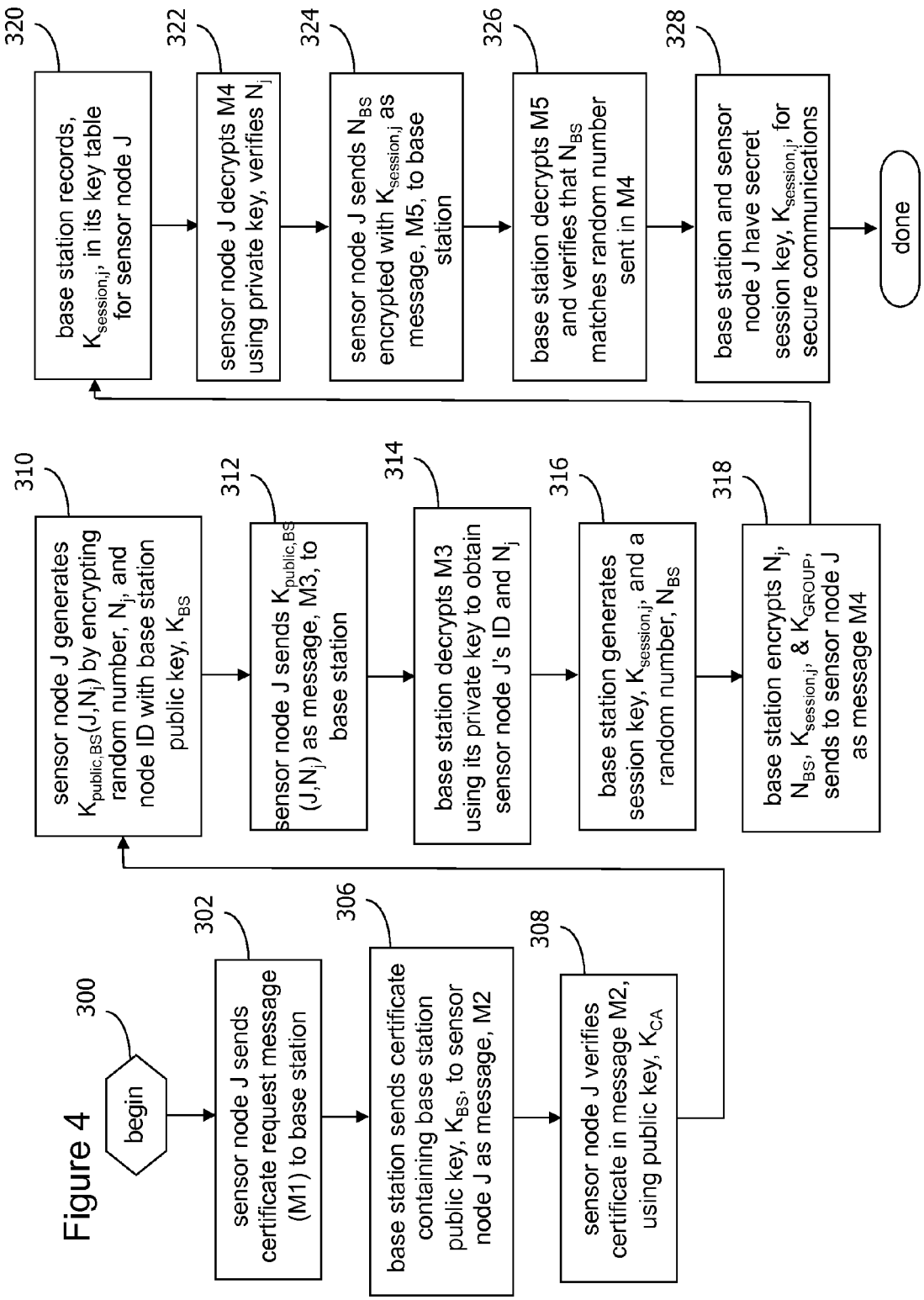
FIG. 4 is a flow diagram of the session key/group key distribution protocol of FIG. 3, according to some embodiments.
Figure 5:
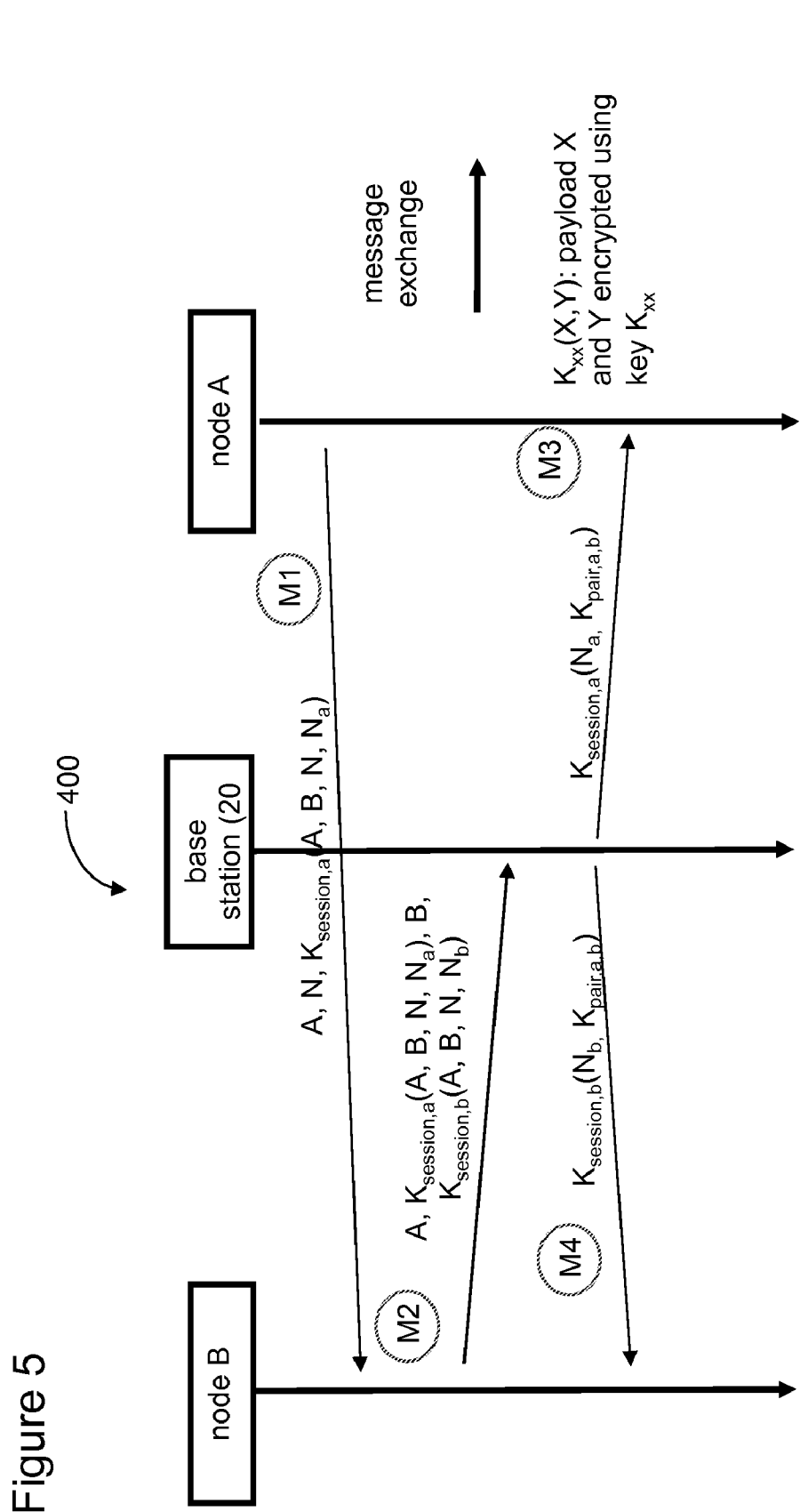
FIG. 5 is a schematic diagram of message exchange occurring for a pair-wise key generation protocol used by the lightweight security framework of FIG. 2, according to some embodiments.

FIG. 2 is a block diagram of a lightweight security framework 100, for enabling secure communication between the entities of the sensor network 28, according to some embodiments. The lightweight security framework 100 includes a session key/group key distribution protocol 300 (FIGS. 3 and 4) and a pair-wise key generation protocol 400 (FIGS. 5 and 6).

As shown in FIG. 2, the lightweight security framework 100 operates according to certain assumptions. For example, the lightweight security framework 100 assumes that the base station 20 and the sensor nodes 22 in the sensor network 28 each include a public key/private key pair 40, a default link layer group key, $K_{group}$, 42, and a certificate authority's public key, $K_{CA}$, 44. The base station 20 and sensor nodes 22 further each include a random number generator 46. The base station 20 includes a key distribution center 48, including a key table 50. These aspects of the lightweight security framework 100 are described in more detail in the following pages.

In some embodiments, the lightweight security framework 100 is implemented as a software program, although one or more aspects of the framework 100 may be implemented in firmware or using hardware logic. The lightweight security framework 100 is distributed throughout the sensor network 28.

As indicated in FIG. 2, all sensor nodes 22 of the sensor network 28 have pre-generated public/private key pairs 40. Before communication between a sensor node 22 and a base station 20 may take place, a session key, $K_{session}$, is generated. The public/private key pair is used to securely obtain the session key, $K_{session}$.

The sensor node 22 shares its public key, $K_{SN}$, with the base station 20. In some embodiments, each sensor node 22 shares its public key with the base station 20 through an out-of-band channel. For example, the base station 20 may physically scan a barcode sticker on the sensor node 22 to acquire its public key. Other mechanisms for conveying the public key, $K_{SN}$, to the base station 20 are possible as well.

A trusted certificate authority (CA) signs the public key belonging to the base station 20, $K_{BS}$. The certificate authority is an entity, whether within the sensor network 28 or external thereto, whom all other entities agree will verify the public key. The certificate authority may be software running on the base station 20, an external server, and so on. The signed public key, $K_{BS}$, is designated herein as $K_{BS*}$. The signed public key, $K_{BS*}$, is sent to the sensor node 22. The signed public key, $K_{BS*}$, may be sent to the sensor node 22 ahead of time, and need not be send to the sensor node during each instance of session key distribution.

Each sensor node 22 in the sensor network 28 has the public key of the certificate authority, $K_{CA}$, pre-programmed before deployment in the sensor network 28. With the CA public key, $K_{CA}$, each sensor node 22 may validate the signed public key, $K_{BS*}$.

Once the sensor node 22 has the base station public key, a session key, $K_{session,SN}$, may be requested. The session key, $K_{session,SN}$, is used to securely exchange data between the sensor node (SN) 22 and the base station 20 in the sensor network 28. The session key, $K_{session,SN}$, may also support end-to-end authentication of the data originator. The session key/group key distribution protocol 300 of the lightweight security framework 100 is now described with reference to a hypothetical sensor node in the sensor network 28, known as sensor node J.

When sensor node J, a new node in the sensor network 28, is deployed, the sensor node J first attempts to establish a shared session key with the base station 20. The shared session key enables the sensor node J to join the sensor network 28, receive queries from other entities in the sensor network 28, whether other sensor nodes 22 or the base station 20, and send data to other entities on the network 28. As with other sensor nodes 22 in the sensor network 28, sensor node J is pre-programmed with its own public/private key pair 40, a default link layer group key, $K_{group}$, 42, and the certificate authority's public key 44 for this deployment.

Figure 3:
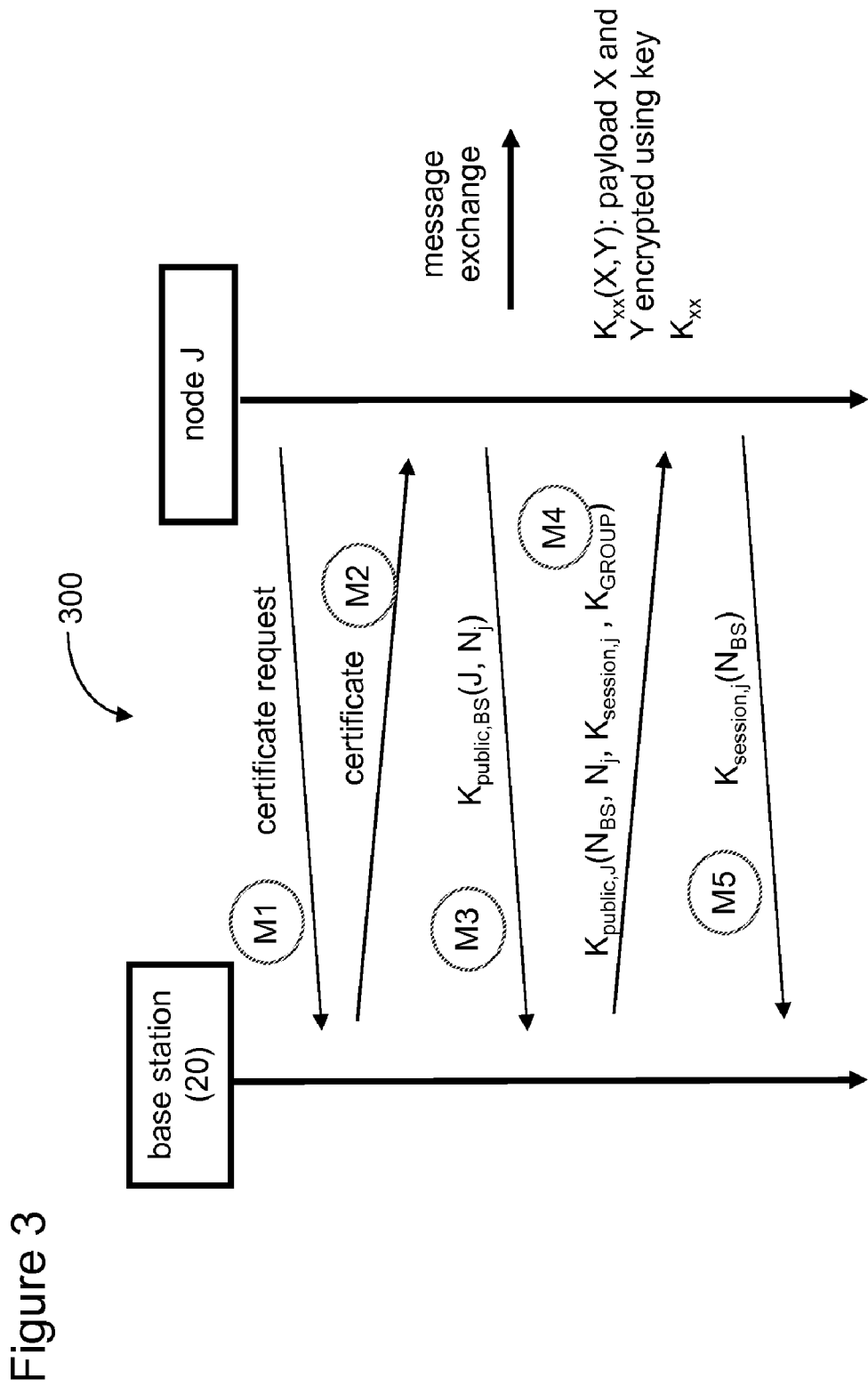
FIG. 3 is a schematic diagram of message exchange occurring for a session key/group key distribution protocol used by the lightweight security framework of FIG. 2, according to some embodiments.

FIG. 3 is a schematic diagram of the session key/group key distribution protocol 300 of the lightweight security framework 100, according to some embodiments. The schematic diagram 300 depicts a message exchange between sensor node J and base station 20, for establishing a session key, $K_{session}$, and an ephemeral group key, $K_{GROUP}$. FIG. 4 is a flow diagram closely tracking the message exchange in FIG. 3, and provides more details about the creation of the messages by the sensor node J and the base station 20.

Each entity on the sensor network 28 initially has a group key, $K_{group}$. All messages transmitted by the base station 20 or a sensor node 22 in the sensor network 28 may be protected at the link layer with a Message Authentication Code (MAC), which may be computed using the message contents and the initial group key, $K_{group}$, or the current group key, $K_{GROUP}$. Each node in sensor network 28 validates the MAC of messages before accepting/forwarding them. Messages without an authentic MAC may be dropped. This group key, $K_{group}$, is intended for initially obtaining network access. In some embodiments, there is a threshold usage, after which use of the group key, $K_{group}$, by an entity causes the entity to be locked out of the network 28. Thus, it is in the interest of the network entity to obtain a new group key, known herein as an ephemeral group key, or $K_{GROUP}$, after accessing the network 28.

The session key/group key distribution protocol 300 is best understood with reference to both FIGS. 3 and 4. At the start of the session key/group key distribution protocol 300, the sensor node J sends a "certificate request" message (M1) to the base station 20 through the sensor network 28 (block 302). The certificate request message may be transmitted using multiple-hop forwarding, as one example. At the link layer, the certificate request message, M1, like other messages, is protected by a message authentication code (MAC), based on the default group key, $K_{group}$. The node J creates an authenticating message authentication code (MAC) for the message prior to transmission. Each node validates this message before accepting/forwarding it. The base station 20 and the sensor nodes 22 have a copy of the default link layer group key, $K_{group}$. Upon receiving the message, M1, the base station 20 sends a certificate containing the public key of the base station, $K_{BS}$, to the node J, as a new message (M2) (block 306). The certificate message, M2, may travel over multiple hops. In some cases, a sensor node 22 other than the sensor node J, such as one disposed along the path from sensor node J to the base station 20, may intercept the certificate request message, M1 and return a cached copy of the certificate message, M2.

The base station 20 and sensor nodes 22 have a copy of the certificate authority's public key (FIG. 2). Accordingly, in the session key/group key distribution protocol 300, the sensor node J uses the certificate authority's public key, $K_{CA}$, to check the certificate received in the message, M2 (block 308). This is considered an "expensive operation". If the certificate (M2) is valid, then sensor node J knows the public key, $K_{BS}$. If the certificate (M2) is invalid, the sensor node J may repeat the steps M1 and M2, using a different path to communicate with the base station 20.

While operating in the sensor network 28, sensor nodes 22 each have a unique identifier (ID), which may be an address. In establishing a session key, sensor node J next picks a random number, $N_j$, encrypts $N_j$ and its own sensor node ID with the base station public key, $K_{BS}$ (block 310) and sends the encrypted message, $K_{public,Bs}(J,N_j)$ to the base station 20 (M3) (block 312). The base station 20 decrypts the message, M3, using its private key, to obtain sensor node J's ID and random number, $N_j$ (block 314). The base station 20 then generates a session key, $K_{session,j}$, and a random number, $N_{BS}$ (block 316). The base station 20 encrypts the random numbers, $N_j$ and $N_{BS}$, as well as the keys, $K_{session,j}$ and $K_{GROUP}$ with the public key of sensor node J, $K_{public,j}$, as $K_{public,j}(N_{BS}, N_j, K_{session,j}, K_{GROUP})$ in a message, M4, and sends M4 to sensor node J (block 318). The base station 20 also records this new $K_{session,j}$ in its key table for sensor node J (block 320).

Once it has received the message, M4, sensor node J uses its private key to decrypt the message, M4 (block 322). This is considered a very expensive operation. The sensor node J checks its random number, $N_j$, to avoid potential replay attacks. If the random number, $N_j$, matches the one sent in M3, sensor node J will now have $K_{GROUP}$ and $K_{session,j}$ to be used for the rest of the packets generated.

Next, the sensor node J sends the random number generated by the base station 20, $N_{BS}$, encrypted with $K_{session,j}$ as message, M5, to the base station 20 (block 324). The base station 20 decrypts the message, M5, and verifies that the random number, $N_{BS}$, matches the one sent in M4 (block 326). The base station 20 now knows that the sensor node J has received the correct session key, $K_{session,j}$. The base station 20 and the sensor node J now share a secret session key, $K_{session,j}$, and may use it to securely exchange all messages between one another (block 328).

When the sensor node J wants to re-key its session key $K_{session,j}$, it simply repeats the steps of FIG. 4, starting with block 310, to obtain a new session key from the base station 20. Any sensor node 22 in the sensor network 28 may forge a packet to initiate the re-keying process, starting with step 310, but only the authentic node (e.g., sensor node J) is capable of correctly decrypting the new session key using its private key. Therefore the re-keying process is secure.

On the other hand, the base station 20 may want to re-key its session key with the sensor node J. In such a circumstance, the base station sends a "re-key request" message, encrypted with sensor node J's current session key, to the sensor node J. This initiates the re-keying process, in which sensor node J again repeats the steps of the session key/group key distribution protocol 300 (FIG. 4), starting with step 310.

There may be circumstances in which the entities in the sensor network 28 desire a higher security guarantee. For example, a session key may be exposed to an adversary to forge a "re-key request". The session key/group key distribution protocol 300 enables the base station 20 to encrypt the "re-key request" message with its own private key and sensor node J's public key. In this case, only the sensor node J may correctly decrypt the "re-key request" message, and, at the same time, also verify the authenticity (actually sent by the base station 20) of this message using the public key, $K_{BS}$, of the base station 20.

The flow diagram of FIG. 4 is a simplified representation of the session key/group key distribution protocol 300. Alternative paths, such as where verification of a transmitted message fails, are not depicted. Where such failures occur, in some cases, parts of the protocol 300 may be repeated. FIG. 4 shows how the session and group keys are generated when each of the delineated steps is successful.

The session key/group key distribution protocol 300 includes several expensive public key cryptography operations at the resource-constraint sensor nodes (in steps 308, 310, and 322). Nonetheless, in some embodiments, the processing overhead is acceptable because these operations are performed a single time, when a sensor node 22 first joins the sensor network 28 or when there is a need to re-key the session or group key. On the other hand, low-overhead symmetric cryptography (using key, $K_{session,j}$) is used for securing communication traffic.

Thus, the lightweight security framework 100 provides the session key/group key distribution protocol 300, for establishing (and periodically re-establishing) a symmetric session key, $K_{session,j}$, between the sensor node J and its associated base station 20. The session key, $K_{session,j}$, is used to securely exchange data between the sensor node J and the base station 20. The sensor node J signs all sensed data (at the application layer) with its session key, $K_{session,j}$, and sends the data to the base station 20. Upon receipt, the base station 20 validates the data with its copy of the session key $K_{session,j}$, and forwards the data to a backend server. Thus, end-to-end authenticity and integrity of data sent from the sensor node J and the base station 20 is ensured. Optionally, the session key $K_{session,SN}$, may be used to provide end-to-end encryption of data, providing secrecy.

Similarly, any two sensor nodes 22 in the sensor network 28, known as sensor node A and sensor node B, may use session keys, as established in FIG. 4, to create a pair-wise key between them by using the base station 20 as a key distribution center (KDC), enabling more general communication patterns.

FIG. 5 is a schematic diagram of the pair-wise key generation protocol 400 of the lightweight security framework 100, according to some embodiments. The schematic diagram 400 depicts a message exchange 400 between sensor nodes A and B and base station 20, for establishing a pair-wise key between the sensor nodes A and B. The sensor nodes A and B are two of the sensor nodes 22 in the sensor network 28. FIG. 5 employs a particular type of symmetric protocol, known as an Ottway-Rees protocol, for establishing pair-wise keys between sensor nodes A and B. FIG. 6 is a flow diagram closely tracking the message exchange in FIG. 5, and provides more details about the creation of the messages by the sensor nodes A and B and the base station 20.

The lightweight security framework 100 uses the pair-wise key generation protocol 400 to establish pair-wise keys between any two sensor nodes A and B. Each sensor node 22 uses its session key, $K_{session,a}$, and $K_{session,b}$, respectively, to execute the pair-wise key generation protocol 400.

The session key/group key distribution protocol 300 is best understood with reference to both FIGS. 5 and 6. Using its session key, $K_{session,a}$, the sensor node A picks two random numbers, N and $N_a$, together with its sensor node ID (A) and the ID of sensor node B (B), and encrypts them to generate a first message, M1 (block 402). The message, M1, thus includes A, N, $K_{session,a}$(A,B,N,$N_a$). A and N are sent in plaintext, not encrypted, so that the sensor node B can learn the ID of the sensor node A and the random number, without knowing the session key, $K_{session,a}$. The sensor node A sends the message, M1, to the sensor node B (block 404).

Sensor node B picks a random number, $N_b$, encrypts the random number, $N_b$, as well as N, and sensor node ID A and B, with its session key, $K_{session,b}$ (block 406). The sensor node B then concatenates the cipher text it received earlier from the sensor node A (from message, M1) into a new message, M2 (block 408). New message, M2, contains A, $K_{session,a}$(A,B, N,$N_a$), B, $K_{session,b}$(A,B,N,$N_b$). As illustrated in FIG. 5, sensor node B sends the message, M2, to the base station 20 (block 410).

The base station 20 decrypts the message, M2, using the session keys it shares with sensor nodes A and B, namely, $K_{session,a}$ and $K_{session,b}$, respectively (block 412), particularly noting that the random number, N, in both parts of the message, M2, is the same. The base station 20 then generates a pair-wise key, $K_{pair,a,b}$, for sensor nodes A and B (block 414).

The base station 20 encrypts the pair-wise key, $K_{pair,a,b}$, separately into a message, M3 (block 416), and a message, M4 (block 418), using its shared session keys, $K_{session,a}$ and $K_{session,b}$, respectively. The base station 20 then sends the message, M3, including $K_{session,a}$($N_a$, $K_{pair,a,b}$) to the sensor node A (block 420), and sends the message, M4, including $K_{session,b}$($N_b$, $K_{pair,a,b}$) to the sensor node B (block 422).

Both sensor nodes A and B decrypt their respective messages, M3 and M4, verify the random numbers, $N_a$ and $N_b$, and obtain the pair-wise key, $K_{pair,a,b}$. (Although the operations of blocks 416 and 418, blocks 420 and 422, and blocks 424 and 426, are shown occurring in a particular sequence, these operations may be performed simultaneously, or in a reversed order from what is shown in FIG. 6.)

The pair-wise key generation protocol 400 thus establishes a session key, $K_{pair,a,b}$, using the session keys, $K_{session,a}$ and $K_{session,b}$, shared between the sensor nodes A and B and the base station 20. By communicating using the session key, $K_{pair,a,b}$, the privacy, integrity, and authenticity of end-to-end communication between the sensor nodes A and B is ensured.

Returning to FIG. 2, the lightweight security framework 100 operates in an environment in which a link-layer symmetric group key, $K_{group}$, is shared by all nodes in a connected mesh. All nodes use the group key, $K_{group}$, to compute a link-layer message authentication code (MAC) on each packet transmitted between entities in the sensor network 28.

The group key, $K_{group}$, is used to protect network resources, as follows. The default group key, $K_{group}$, is pre-programmed in each sensor node 22 before deployment in the sensor network 28. The group key, $K_{group}$, allows the sensor node 22 to join the network 28. (A NULL default group key is possible, in some embodiments, although less desirable.) The sensor node 22 may then use the group key, $K_{group}$, to compute a link-layer MAC code on each packet to be transmitted within the sensor network 28.

However, sensor nodes 22 that employ the default group key, $K_{group}$, for more than a threshold number of packets may be blacklisted from the network 28. Each sensor node 22 maintains a count of such instances. Thus, where the usage of the group key, $K_{group}$, has exceeded that threshold, the sensor node will be unable to communicate further in the sensor network.

To avoid getting blacklisted, the sensor node 22 may obtain a new group key, an ephemeral group key, $K_{GROUP}$, from the base station 20 using the session key/group key distribution protocol 300 (FIGS. 3 and 4). This group key, $K_{GROUP}$, may be securely distributed either using the public/private key pairs or by leveraging the session keys also generated by the session key/group key distribution protocol 300. A new group key may be generated and distributed periodically.

The sensor node 22 may then authenticate each packet before transmission, using the ephemeral group key, $K_{GROUP}$. The MAC-authenticated packet may then be transmitted to another entity in the sensor network 28. At the receiving end, the packet is validated. If the MAC is valid, the transmission is successful. Packets received at the link layer without a valid MAC are dropped, minimizing the impact of a DoS (Denial of Service) attack.

The above scheme is unique in its application to sensor networks in its use of a symmetric session key for data protection and a symmetric group key for network protection, both bootstrapped from a public/private key pair.

Current security mechanisms in resource-constrained sensor networks are based on symmetric cryptography and often do not support dynamic key distribution and management. The lightweight security framework 100, by contrast, combines computation-intensive public key infrastructure (PKI) with symmetric key cryptography and exploits the system asymmetry in a heterogeneous and hierarchical sensor network. Additionally, the lightweight security framework 100 shifts much of the security-related computational load away from resource-constrained sensor nodes and toward resource-rich base stations.

Further, the protocols 300 and 400, described above, have a relatively low code complexity, high flexibility, and a minimal processing overhead requirement. As an example of the lightweight security framework 100 flexibility, new sensor nodes may be dynamically added to the sensor network. The lightweight security framework 100 further protects the network resources and ensures data authenticity and integrity.

The lightweight security framework 100 may be implemented in network devices and systems, particularly for applications that demand high security. As one example, the ability to protect the privacy, integrity, and authenticity of health data is essential for products that enable health-related data acquisition. The lightweight security framework may even lower the bill of materials cost of sensor devices (by reducing the computational complexity), while still meeting a system's security requirements.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. In a multiple-hop sensor network comprising a plurality of base stations and a plurality of sensor nodes, each base station and each sensor node comprising a public/private key pair, a certificate authority public key, and a default group key, a method to securely exchange data between a base station of the plurality of base stations and a sensor node of the plurality of sensor nodes, the method comprising:
   receiving, by the base station, a sensor node public key of the sensor node, the base station and the sensor node each comprising an application layer and a link layer;

transmitting, by the base station, a base station public key to the sensor node, wherein the base station public key is authenticated using the default group key;

distributing, by the base station, a session key and an ephemeral group key to the sensor node using the sensor node public key, the base station public key, and the certificate authority public key; and using the session key and the ephemeral group key to securely transmit and receive packets on the multiple-hop sensor network, wherein packets lacking the ephemeral group key are dropped at the link layer before any processing at the application layer commences and packets lacking the session key are dropped at the application layer.

2. The method of claim 1, transmitting the base station public key of the base station to the sensor node further comprising:

receiving, by the base station, a certificate request message from the sensor node, wherein the certificate request message is protected using the default group key;

verifying, by the base station, the certificate request message using the default group key;

sending, by the base station, a certificate containing a signed base station public key to the sensor node, the base station public key having been signed by a trusted certificate authority to produce the signed base station public key, wherein the certificate is further protected using the default group key;

wherein:

the certificate is validated at the link layer using the default group key; and the signed base station public key is obtained by verifying the certificate using the certificate authority public key.

3. The method of claim 2, distributing the session key and an ephemeral group key by the base station to the sensor node using the sensor node public key, the base station public key, and the certificate authority public key further comprising:

receiving, by the base station, a message from the sensor node, wherein the message is created using the base station public key to encrypt a random number and an identifier of the sensor node;

decrypting, by the base station, the message using the base station private key to obtain the random number and the sensor node identifier, the base station generating a session key and an ephemeral group key, wherein the session key and ephemeral group keys are encrypted using the sensor node public key; and transmitting, by the base station, the session key and ephemeral group key to the sensor node in a second message.

4. The method of claim 3, further comprising:
generating, by the base station, a second random number;
encrypting, by the base station, the random number and the second random number, as well as the session key and the ephemeral group key, using the sensor node public key, in the second message;

wherein the second message is to be decrypted by the sensor node using its private key.

5. The method of claim 4, further comprising:
receiving, by the base station, a third message, wherein the third message is encrypted using a second random number;
decrypting, by the base station, the third message, wherein the session key is known to the base station as valid for the sensor node if the second random number matches the second random number sent by the base station;

wherein the session key is used to securely exchange messages between the base station and the sensor node if the respective random numbers of each has been validated.

6. The method of claim 5, further comprising:
the base station recording the session key in its key table.

7. The method of claim 1, receiving a sensor node public key of the sensor node by the base station further comprising:
receiving, by the base station, the sensor node public key through an out-of-band channel;

wherein the base station has the sensor node public key before the sensor node requests the base station public key.

8. The method of claim 1, further comprising:
receiving, by the base station, an encrypted first message from the sensor node, the first message comprising an identifier of the sensor node, an identifier of a second sensor node, a random number, and a second random number, wherein the first message is protected by the session key shared with the base station sent by the sensor node to the second sensor node;

receiving, by the base station, a second message comprising a third random number from the second sensor node, wherein the third random number is encrypted with a second session key to form an encrypted third random number, the second session key enabling secure communication between the second sensor node and the base station, the third random number being encrypted and concatenated with the first message to form the second message;

generating, by the base station, a pair-wise group key;
wherein each message is protected using the ephemeral group key so that neither the first nor second sensor node process a message at the application layer until the ephemeral group key is identified in the message at the link layer and, if the ephemeral group key is present, the pair-wise group key is used to securely transmit packets between the sensor node and the second sensor node.

9. The method of claim 2, further comprising:
encrypting, by the base station, a pair-wise session key into a third message using the session key shared with the sensor node;

sending, by the base station, the third message to the sensor node;

encrypting, by the base station, the pair-wise group key into a fourth message using the second session key shared with the second sensor node; and sending, by the base station, the fourth message to the second sensor node.

10. In a multiple-hop sensor network comprising a plurality of base stations and a plurality of sensor nodes, each base station and each sensor node comprising a public/private key pair, a certificate authority public key, and a default group key, a method to securely exchange data between a base station of the plurality of base stations and a sensor node of the plurality of sensor nodes, the method comprising:

transmitting, by the sensor node, a sensor node public key to the base station, the base station and the sensor node each comprising an application layer and a link layer;

receiving, by the sensor node, a base station public key from the base station, wherein the sensor node authenticates the base station public key using the default group key;

receiving, by the sensor node, a session key and an ephemeral group key from the base station, wherein the session key and ephemeral group key are distributed using the sensor node public key, the base station public key, and the certificate authority public key; and using the session key and the ephemeral group key to securely transmit and receive packets on the multiple-hop sensor network, wherein packets lacking the ephemeral group key are dropped by the sensor node at the link layer before any processing at the application layer commences and packets lacking the session key are dropped by the sensor node at the application layer.

11. The method of claim 10, transmitting the base station public key of the base station to the sensor node further comprising:
sending, by the sensor node, a certificate request message to the base station, wherein the certificate request message is protected using the default group key;
receiving, by the sensor node, a certificate containing a signed base station public key from the base station, the base station public key having been signed by a trusted certificate authority to produce the signed base station public key, wherein the certificate request message is verified using the default group key;
validating, by the sensor node, the certificate at the link layer using the default group key; and
obtaining, by the sensor node, the signed base station public key from the certificate by verifying the certificate using the certificate authority public key.

12. The method of claim 11, receiving, by the sensor node, the session key and an ephemeral group key from the base station using the sensor node public key, the base station public key, and the certificate authority public key further comprising:
using, by the sensor node, the base station public key to encrypt a random number and an identifier of the sensor node, resulting in a message;
transmitting, by the sensor node, the message to the base station, wherein the message is decrypted using the base station private key to obtain the random number and the sensor node identifier; and
receiving, by the sensor node, a second message from the base station, the second message comprising the session key and the ephemeral group key, wherein the session key and ephemeral group keys are encrypted using the sensor node public key.

13. The method of claim 12, further comprising:
decrypting, by the sensor node, the second message using the sensor node private key, the second message including the random number generated by the sensor node;
wherein the session key is valid for the sensor node only if the random number matches the random number sent by the sensor node.

14. The method of claim 13, further comprising:
encrypting, by the sensor node, the second random number with the session key to generate a third message; and
sending, by the sensor node, the third message to the base station; and
wherein the session key is used to securely exchange messages between the base station and the sensor node if both the base station and the sensor node validate their respective random numbers.

15. The method of claim 10, transmitting a sensor node public key of the sensor node to the base station further comprising:
transmitting, by the sensor node, the sensor node public key to the base station through an out-of-band channel;
wherein the base station has the sensor node public key before the sensor node requests the base station public key.

16. The method of claim 10, further comprising:
encrypting, by the sensor node, a first message to the base station, the first message comprising an identifier of the sensor node, an identifier of a second sensor node, a random number, and a second random number, wherein the first message is protected by the session key shared with the base station sent by the sensor node to the second sensor node.

17. The method of claim 16, further comprising:
receiving, by the sensor node, a pair-wise group key from the base station, wherein the pair-wise group key results from communication between the base station and the second sensor node;
wherein each message is protected using the ephemeral group key so that neither the first nor second sensor node process a message at the application layer until the ephemeral group key is identified in the message at the link layer and, if the ephemeral group key is present, the sensor node and the second sensor node use the pair-wise group key to securely transmit packets between one another.

18. The method of claim 11, further comprising:
decrypting, by the sensor node, a third message from the base station to obtain the pair-wise group key;
wherein the pair-wise group key enables secure communication between the sensor F.

19. The method of claim 10, further comprising:
receiving, by the sensor node, a packet from the base station or another base station of the plurality of base stations, or from another sensor node of the plurality of sensor nodes, wherein the packet is not intended for the sensor node, but is intended for another sensor node; and
forwarding, by the sensor node, the packet to another sensor node only if the packet includes the ephemeral group key.

* * * * *